Aug. 29, 1967   P. H. BOUCHER   3,337,986
AUTOMATIC PLANT POT FILLING MACHINE
Filed March 8, 1966   3 Sheets-Sheet 2
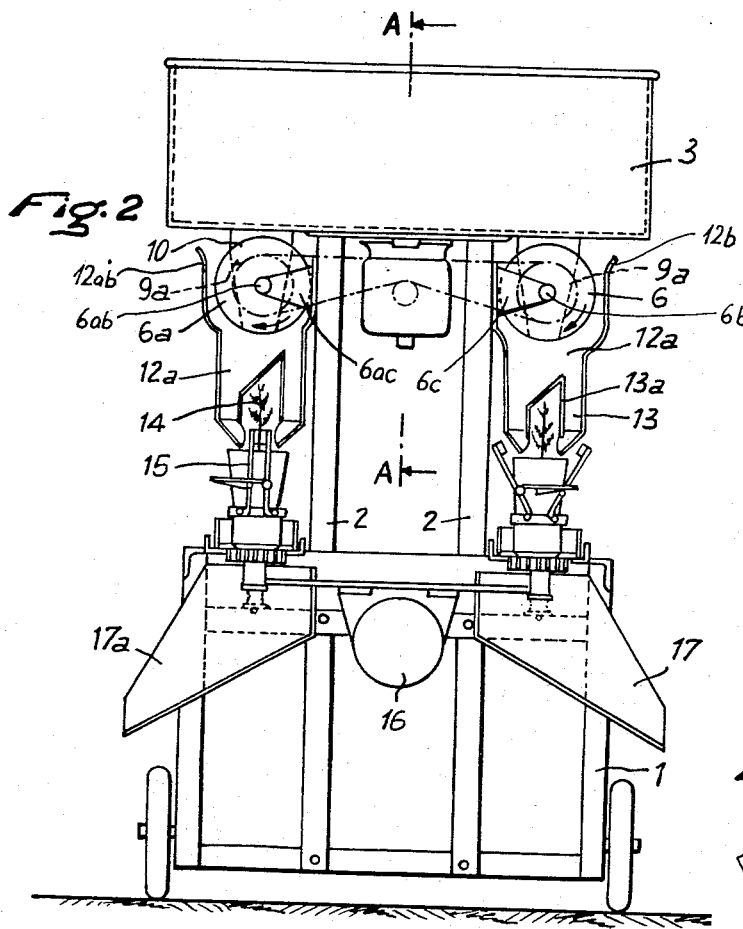
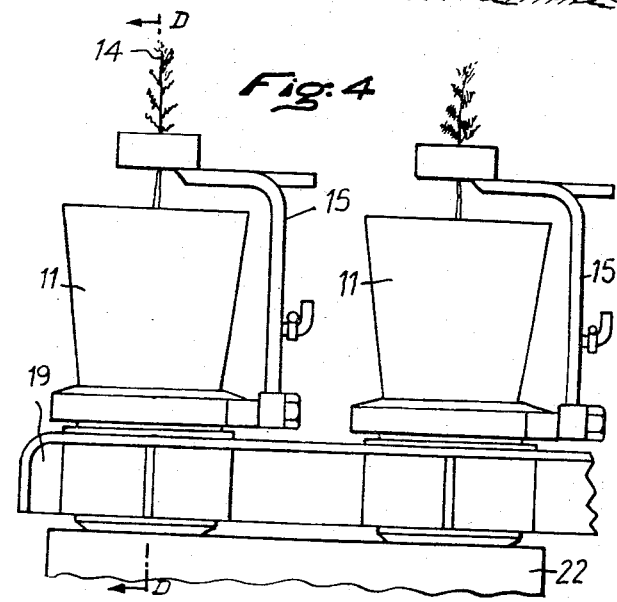
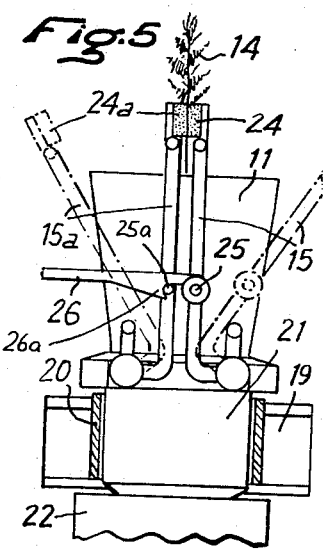
INVENTOR:
Paul Henry BOUCHER
by: Arthur O. Klein
his Attorney Aug. 29, 1967   P. H. BOUCHER   3,337,986
AUTOMATIC PLANT POT FILLING MACHINE
Filed March 8, 1966   3 Sheets-Sheet 3
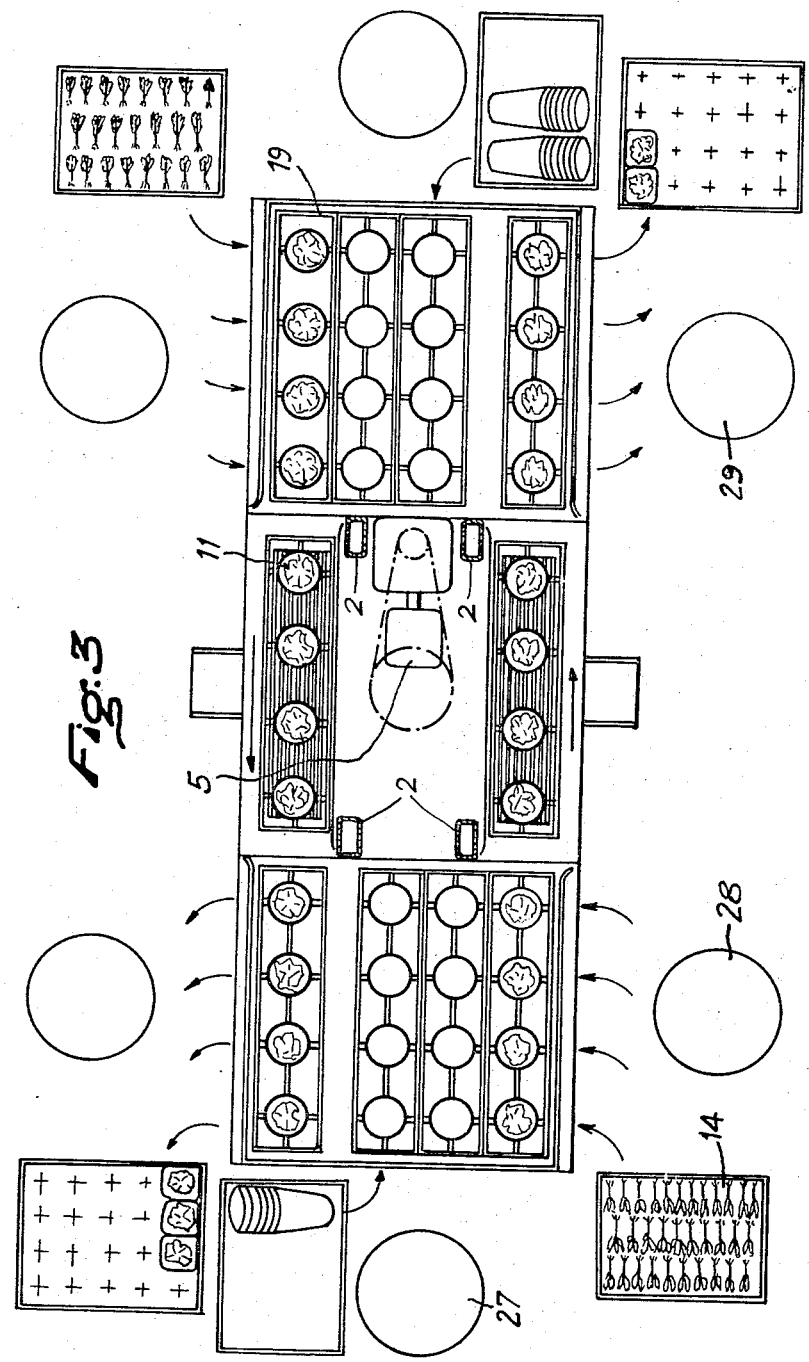
INVENTOR
Paul Henry Boucher 3,337,986
AUTOMATIC PLANT POT FILLING MACHINE
Paul H. Boucher, Gerardmer, France, assignor to Henry Boucher Fils & Cie, Gerardmer, France, a society
Filed Mar. 8, 1966, Ser. No. 532,675
Claims priority, application France, Mar. 11, 1965, PV 8,780
10 Claims. (Cl. 47—1)

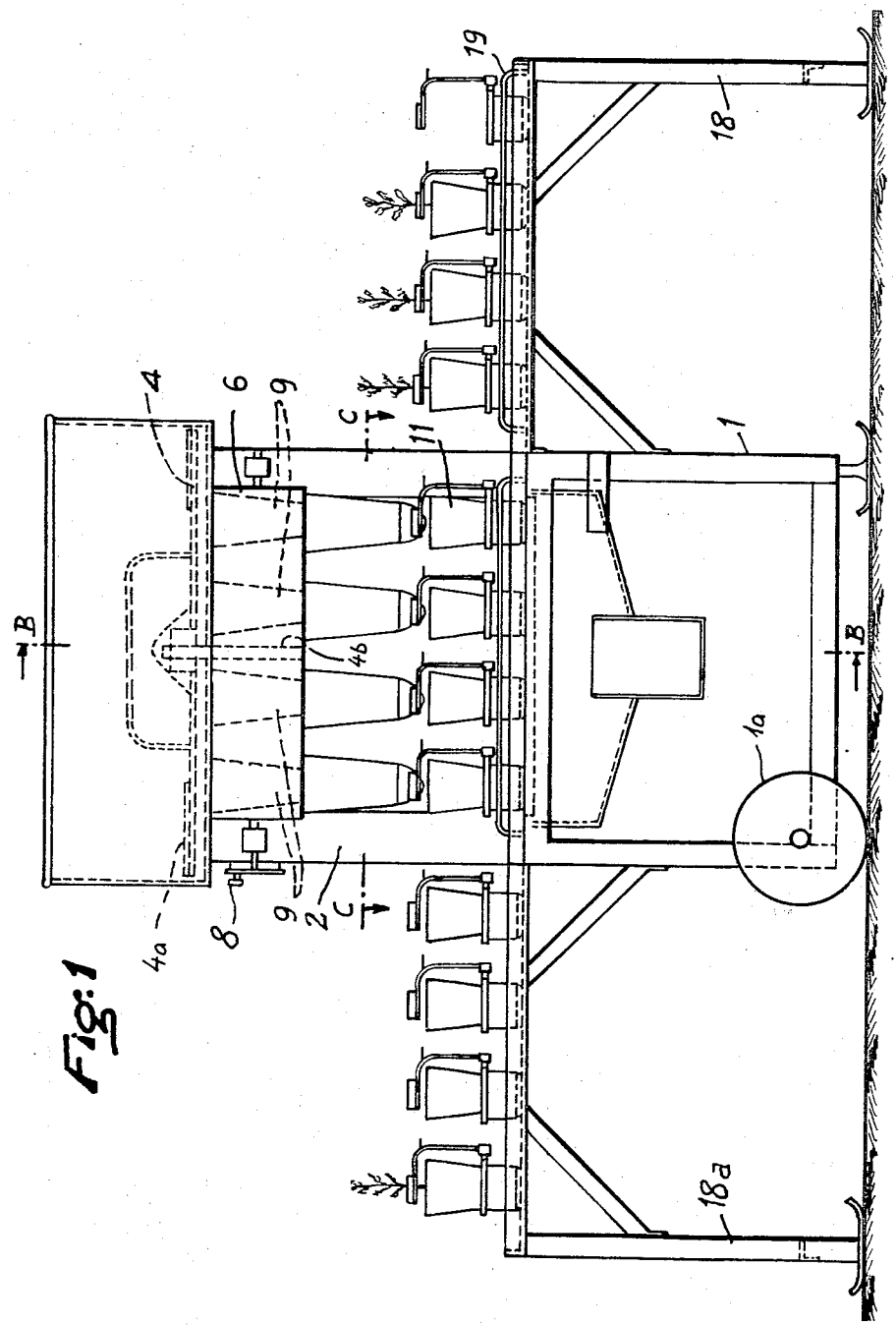

The present invention relates to an automatic plant pot filling machine.

The machine of this invention is particularly adapted for filling buckets or pots made preferably of fibrous material, such as peat, which are not to be emptied again after having implanted therein grains, bulbs, young seeds, saplings and the like.

It becomes more imperative, in view of the high cost of labor, to reduce the time required to manufacture this type of product, i.e. to utilize the labor force more efficiently.

It is, therefore, a general object of this invention, to provide a labor-saving automatic plant pot filling machine.

It is a more specific object of this invention to provide an automatic plant pot filling machine which includes automatic mechanical means for manipulating the pots, transporting the pots, filling the pots with earth fill, and placing the grains, saplings plants or the like in the earth fill, said machine requiring only the aid of a non-specialized type of manual labor force.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is an elevation with a partial cross-sectional view along line A—A of the device illustrated in FIG. 2;

FIG. 2 is a cross-sectional elevation of the device of this invention along line B—B in FIG. 1;

FIG. 3 is a plan view of the device of this invention with a partial cross-sectional view along line C—C in FIG. 1;

FIG. 4 is an elevational partial side view of the assembly line means of the device of this invention which are provided with pot holding means; and FIG. 5 is a cross-sectional view along line D—D of the assembly line means illustrated in FIG. 4.

Referring now specifically to the drawings, there is illustrated an automatic pot-filling mechanism which is supported on frame 1. A pair of wheels 1a are rotatably mounted on the frame 1 and serve to facilitate the moving of the frame 1. Four posts 2 are mounted on the frame 1 and support a removable hopper 3 which is adapted to store the earth fill. The hopper 3 is provided with a rotary mixer 4 having rotating tools 4a which are axially connected to a shaft 4b. The mixer 4 is connected via the shaft 4b to a reduction motor 5 which serves to rotate the tools 4a in the hopper 3. Two cylindrical distribution members 6, 6a are respectively axially secured on the shafts 6b, 6ab. Two pairs of bracket members 6c, 6ac, are respectively secured to the posts 2 and rotatably support the shafts 6b, 6ab underneath the hopper 3. The distribution members 6, 6a are adapted to be rotated via the shafts 6b, 6ab by the reduction motor 7 to which they are respectively connected by clutch members 8. Each one of the cylindrical distribtuion members 6, 6a has a plurality of lateral cavities 9, 9a, each of which has a volume corresponding substantially to that of the largest pot which is to be filled by the pot-filling device of this invention. The automatic pot filling machine of this invention may be adapted for filling pots of smaller dimensions by wedging fittings (not illustrated) into the bottom of the cavities 9, 9a, thereby reducing the volume thereof. The cavities 9, 9a are filled with loose earth fill when the cylindrical distribution members 6, 6a are in the filling position, that is to say, when the openings of the cavities 9, 9a are in register with corresponding openings 10 at the bottom of the hopper 3. This loose earth fill is then transferred to a corresponding number of distribution spout members 12 by rotation of the cylindrical distribution members 6, 6a. The distribution spout members 12, 12a, which are arranged immediately underneath the distribution members 6, 6a in alignment with the cavities 9, 9a thereof, and are supported by the post 2, pour the earth fill into the pots 11. Each one of the distribution spout members 12, 12a include an upper wide receiving portion 12b, 12ab, which substantially surrounds the corresponding cylindrical distribution member 6, 6a, and at its lower end is provided with two spouts 13, 13a which direct the loose earth fill into the plant pots 11 in a manner that leaves room at the center of the pots for the insertion of plants or the like 14. Each one of the latter are held in position by a pair of pincer arms 15, 15a, the construction of which is explained in greater detail below. The plant pots 11 are vibrated by a vibrating mechanism 16 which causes the loose earth fill to compactly settle after the plant or the like 14 has been manually inserted therein. The excess loose earth fill which falls out of the top of the pots 11 is removed via the spouts 17, 17a.

A pair of tables 18, 18a are removably mounted at opposite sides of the frame 1 (see FIG. 1) and complete the installation of the automatic pot-filling machine of this invention.

The positioning and the transporting of the plant pots 11 to the plant inserting station and the earth filling station is accomplished by means of a welded steel assembly belt installation 19 which is provided with guide tubes 20 at each side thereof. The pots 11 are placed in socket members 21 which are placed between the guide tubes 20 so as to rest with their bottom surfaces on top of the belt of the belt installation 19.

The socket members 21 which hold the pots 11 are then transported over the vibrating table 22 so that the bottom surface of the socket members 21 remain in contact with the top surface of the vibrating table 22 and thereby are vibrated in the vertical direction by the latter while the tubes 20 prevent the pots 11 from being laterally displaced.

Each socket member 21 has pivotally mounted thereon a pair of pincer arms 15, 15a. The latter are provided at their upper ends with pivotally mounted soft pads 24, 24a, made of rubber or any other suitable elastomer material, which are designed to hold, but not to injure the plants or the like when clampingly holding them. The pincer arms 15, 15a are adapted to be closed manually by means of a locking device which comprises a locking arm 26 that is pivotally mounted on a shaft 25 that projects from the pincer arm 15 and is integral therewith. A lug 25a projects from the other pincer arm 15a and is adapted to be engaged by the protuberance 26a of the locking arm 26, thereby holding the pincer arms 15, 15a clampingly together.

The pincer arms 15, 15a are firmly connected with the socket member 21 and, consequently, move jointly therewith. Thus, when the pincer arms 15, 15a clampingly hold the plant or the like 14, there occurs no relative movement between the plant 14 and the plant pot 11 during the filling operation and, above all, during the settling operation by vibration of the earth fill which is essential to avoid injuring the plants 14.

The automatic pot-filling machine of this invention operates as follows:

A workman 27, who situates himself at one end of the removable table 18, places the pots 11 into the sockets 21 of the assembly belt installation 19. The pots 11 then pass in front of a second workman 28 who positions the plants or the like 14 by means of the pincer arms 15, 15a. The pots 11 are then transported by the assembly belt installation 19 to the earth filling and settling station and thence to the second removable table 18a from which they are removed by a third workman 29 who rapidly wets the pots 11 in a waterholding container in order to loosen somewhat the earth in the pots 11 as well as the pots 11 themselves, and subsequently stores the pots 11 in suitable containers such as plastic or wooden boxes.

Since the whole installation is symmetrically arranged, the same steps of positioning the pots 11, positioning the plants or the like 14, the filling and settling operations, and the removal of the filled pots can be effectuated similarly at the opposite side of the installation by another set of workmen, so that the assembly belt installation 19 returns empty to its starting position without any supplementary operative steps.

In the event the production capacity for the pot filling machine is to be decreased, it is possible to disconnect one of the distribution cylinders 6, 6a by means of the clutch member 8 and only operate one half of the device.

The device of this invention is particularly advantageous because it permits the usage of plant pots 11 made of rather fragile fibrous material without breaking them. The plant pots are positively guided in the socket members 21 during the vibration operation and therefore, the risk of breakage is reduced to a minimum.

While a specific embodiment of the invention has been shown and described in detail to illustrate the application of the inventive principles, it will be understood that the invention may be embodied otherwise without departing from such principles.

What is claimed is:

1. An automatic plant pot filling machine, comprising in combination, a frame, earth filling means operatively mounted in said frame and adapted to hold loose earth fill, assembly belt means operatively mounted in said frame underneath said earth filling means, said assembly belt means being adapted to sequentially transport a plurality of plant pots into an earth filling position and an earth settling position wherein said plurality of plant pots are selectively filled by said earth filling means with loose earth fill, and the earth fill is settled thereafter in said plant pots by vibrating them, said assembly belt means including plant holding means for holding plants or the like in said plant pots, and vibrating means operatively mounted in said frame adjacent to said assembly belt means and operatively connected thereto for vibrating said plurality of plant pots and thereby settling the loose earth fill stored therein when said plurality of plant pots are in said earth settling position.

2. The automatic plant pot filling machine as set forth in claim 1, wherein said plant holding means are adapted to be rigidly connected to said assembly belt means so as to firmly hold a plant and prevent any relative movement between the latter and one of said plurality of plant pots during the settling of the earth fill by vibration.

3. The automatic plant pot filling machine as set forth in claim 1, wherein said assembly belt means comprise a plurality of socket members each of which is adapted to hold one of the plant pots of said plurality of plant pots.

4. The automatic plant pot filling machine as set forth in claim 3, wherein each of said socket members has a pair of pincer arms pivotally mounted thereon, and a locking member operatively mounted on one of said pair of pincer arms and adapted to engage the other one of said pair of pincer arms and thereby hold said pair of pincer arms in a locked position.

5. The automatic plant pot filling machine as set forth in claim 1, wherein said earth filling means comprise a hopper, mixing tool means rotatably mounted in said hopper, and first electric motor means operatively connected to said mixing tool means for rotating the same.

6. The automatic plant pot filling machine as set forth in claim 5, wherein said hopper includes at least one opening in its bottom, a distribution cylinder rotatably mounted on said frame immediately below said hopper, said distribution cylinder having at least one lateral cavity adapted to register with the opening in said hopper, said cavity having substantially the same volume as the volume of one of said plurality of plant pots, and second electric motor means operatively connected to said distribution cylinder for rotating the same, whereby when said cavity in said distribution cylinder is then rotated by said second electric motor means said loose earth fill is transferred to a preselected one of said plurality of plant pots.

7. The automatic plant pot filling machine as set forth in claim 6, including spout means mounted on said frame immediately below said distribution cylinder, said spout means surrounding at least partially said distribution cylinder and directing the loose earth fill therefrom to at least one preselected one of said plurality of plant pots.

8. The automatic plant pot filling machine as set forth in claim 1, wherein said frame comprises a central portion and at least one side table removably connected thereto, said vibrating means being operatively mounted immediately below said central portion.

9. The automatic plant pot filling machine as set forth in claim 8, wherein said plurality of plant pots are manually placed in a plant positioning position on said side table and are transported from said plant positioning position to said earth filling and earth settling position by said assembly belt means, and third electric motor means operatively connected to said assembly belt means.

10. The automatic plant pot filling machine as set forth in claim 6, including clutch means mounted between said distribution cylinder and said second electric motor means for selectively engaging and disengaging said distribution cylinder and said second electric motor means.

References Cited

UNITED STATES PATENTS

| | | | |
|---|---|---|---|
| 2,771,709 | 11/1956 | Ritter | 47—1 |
| 2,826,003 | 3/1958 | Oki et al. | 47—1 |
| 2,869,283 | 1/1959 | Krause | 47—1 |
| 2,884,022 | 4/1959 | Geary | 141—72 |
| 3,012,370 | 12/1961 | Lortz et al. | 47—1 |
| 3,157,389 | 11/1964 | Williams | 259—1 |

FOREIGN PATENTS 75,992   12/1949   Norway.

ABRAHAM G. STONE, *Primary Examiner.*
ROBERT E. BAGWILL, *Examiner.*